US012651203B2

(12) United States Patent
Park et al.

(10) Patent No.: US 12,651,203 B2
(45) Date of Patent: Jun. 9, 2026

(54) SYSTEM AND METHOD FOR TRAINING TEACHER MODEL BASED ON STRUCTURE OF STUDENT MODEL

(71) Applicant: SAMSUNG ELECTRONICS CO., LTD., Suwon-si (KR)

(72) Inventors: Daeyoung Park, Yongin-si (KR); Changwook Jeong, Hwaseong-si (KR); Moonhyun Cha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1212 days.

(21) Appl. No.: 17/460,698

(22) Filed: Aug. 30, 2021

(65) Prior Publication Data

US 2022/0207431 A1 Jun. 30, 2022

(30) Foreign Application Priority Data

Dec. 31, 2020 (KR) ........................ 10-2020-0189861

(51) Int. Cl.
| | |
|---|---|
| *G06N 20/20* | (2019.01) |
| *G06F 18/21* | (2023.01) |
| *G06F 18/214* | (2023.01) |
| *G06N 3/092* | (2023.01) |

(52) U.S. Cl.
CPC ........... *G06N 20/20* (2019.01); *G06F 18/214* (2023.01); *G06F 18/2163* (2023.01); *G06N 3/092* (2023.01)

(58) Field of Classification Search
CPC .... G06N 20/20; G06N 3/092; G06F 18/2163; G06F 18/214
See application file for complete search history.

(56) References Cited

U.S. PATENT DOCUMENTS

| | | | |
|---|---|---|---|
| 10,289,962 | B2 | 5/2019 | Vinyals et al. |
| 10,635,977 | B2 | 4/2020 | Chung et al. |
| 2017/0132528 | A1* | 5/2017 | Aslan ..................... G06N 20/00 |
| 2019/0378006 | A1 | 12/2019 | Fukuda et al. |

(Continued)

FOREIGN PATENT DOCUMENTS

| | | |
|---|---|---|
| CN | 110209981 A | 9/2019 |
| CN | 110674880 A | 1/2020 |

(Continued)

OTHER PUBLICATIONS

Sun et al. Patient Knowledge Distillation for BERT Model Compression. Microsoft Dynamics 365 AI Research. 2019 (Year: 2019).*

(Continued)

*Primary Examiner* — Michelle T Bechtold
*Assistant Examiner* — Robert Bejcek, II
(74) *Attorney, Agent, or Firm* — Sughrue Mion, PLLC

(57) ABSTRACT

A computer-implemented method of training a teacher model and a student model includes dividing the teacher model into a series of teacher blocks each comprising at least one layer; generating a first student branch receiving a first feature output from a first teacher block among the series of teacher blocks; training the teacher model based on outputs of the teacher model and the first student branch; and training the student model comprising a series of student blocks based on the trained teacher model, wherein the first student branch includes at least one student block.

16 Claims, 9 Drawing Sheets

(56)     References Cited

U.S. PATENT DOCUMENTS

| | | | |
|---|---|---|---|
| 2020/0302295 A1 | 9/2020 | Tung et al. | |
| 2022/0366259 A1* | 11/2022 | Wang ..................... | G06N 3/082 |

FOREIGN PATENT DOCUMENTS

| | | |
|---|---|---|
| KR | 10-2019-0090141 A | 8/2019 |
| WO | 2019/240964 A1 | 12/2019 |

OTHER PUBLICATIONS

Lan et al. Knowledge Distillation by On-the-Fly Native Ensemble. 32nd Conference on Neural Information Processing Systems (NIPS 2018), Montréal, Canada. (Year: 2018).*

Lan et al., "Knowledge Distillation by On-the-Fly Native Ensemble", NIPS, 2018, arXiv:1806.04606v2 (11 pages total).

Bae et al., "Layer-wise hint-based training for knowledge transfer in a teacher-student framework", ETRI Journal, 2019, pp. 242-253 (12 pages total).

* cited by examiner

FIG. 8

| student | ShuffleV2 | | | |
|---|---|---|---|---|
| teacher | resnet32x4 | | | |
| metric | w/o SFTN | | SFTN | |
|  | KL | CKA | KL | CKA |
| training data 1 | 1.10 | 0.8822 | 0.47 | 0.9499 |
| training data 2 | 0.79 | 0.8873 | 0.38 | 0.9538 |
| training data 3 | 0.86 | 0.8818 | 0.42 | 0.9501 |
| training data 4 | 0.95 | 0.8900 | 0.45 | 0.9497 |
| training data 5 | 0.88 | 0.8832 | 0.45 | 0.9476 |
| training data 6 | 0.88 | 0.8849 | 0.47 | 0.9458 |
| training data 7 | 0.89 | 0.8882 | 0.46 | 0.9479 |
| training data 8 | 0.92 | 0.8822 | 0.47 | 0.9475 |
| training data 9 | 0.80 | 0.8847 | 0.42 | 0.9474 |
| training data 10 | 0.81 | 0.8836 | 0.43 | 0.9476 |
| training data 11 | 0.59 | 0.9118 | 0.28 | 0.9632 |
| training data 12 | 0.85 | 0.9027 | 0.37 | 0.9607 |

SYSTEM AND METHOD FOR TRAINING TEACHER MODEL BASED ON STRUCTURE OF STUDENT MODEL

CROSS-REFERENCE TO RELATED APPLICATION

This application is based on and claims priority under 35 U.S.C. § 119 to Korean Patent Application No. 10-2020-0189861, filed on Dec. 31, 2020, in the Korean Intellectual Property Office, the disclosure of which is incorporated by reference herein in its entirety.

BACKGROUND

1. Field

The inventive concept relates to training a machine learning model, and more particularly, to a system and method for training a student-friendly teacher model and a student model.

2. Description of the Related Art

Machine learning models have been used in various fields. A machine learning model may have a complex structure for more accurate results and may require a lot of resources. Accordingly, in order to apply a machine learning model to a platform having limited resources, such as home appliances, mobile phones, and Internet of Things (IoT) devices, model compression may be used. Model compression may be important to provide a lightweight machine learning model that is executable on limited resources and provides high accuracy.

SUMMARY

The inventive concept provides a system and method for model compression that provides improved accuracy.

According to an aspect of the disclosure, there is provided a training system comprising: a memory storing instructions; and at least one processor configured to access the memory and execute the instructions to: divide a teacher model into a plurality of teacher blocks each comprising at least one layer; generate a first student branch, which receives a first feature output from a first teacher block among the plurality of teacher blocks; train the teacher model based on one or more outputs of the teacher model and a first output of the first student branch; and train a student model comprising a plurality of student blocks based on the trained teacher model, wherein the first student branch corresponds to at least one first student block, among the plurality of student blocks.

According to another aspect of the disclosure, there is provided a computer-implemented training method comprising: dividing a teacher model into a plurality of teacher blocks each comprising at least one layer; generating a first student branch, which receives a first feature output from a first teacher block among the plurality of teacher blocks; training the teacher model based on outputs of the teacher model and a first output of the first student branch; and training a student model comprising a plurality of student blocks based on the trained teacher model, wherein the first student branch corresponds to at least one first student block, among the plurality of student blocks.

According to an aspect of the disclosure, there is provided a non-transitory computer-readable storage medium comprising instructions executable by at least one processor, wherein the instructions cause the at least one processor to perform operations of model training comprising: dividing a teacher model into a plurality of teacher blocks each comprising at least one layer; generating a first student branch, which receives a first feature output from a first teacher block among the plurality of teacher blocks; training the teacher model based on outputs of the teacher model and a first output of the first student branch; and training a student model comprising a plurality of student blocks based on the trained teacher model, wherein the first student branch corresponds to at least one first student block, among the plurality of student blocks.

According to an aspect of the disclosure, there is provided an apparatus comprising: a memory storing instructions; and at least one processor configured to access the memory and execute the instructions to: generate a first branch having one or more layers and receiving a first feature output from a first layer of a first model, the one or more layers of the first branch corresponding to one or more second layer of a second model; input training data to the first model and the first branch; and train the first model based on one or more outputs of the first model and a first output of the first branch in response to the training data.

BRIEF DESCRIPTION OF THE DRAWINGS

Embodiments of the inventive concept will be more clearly understood from the following detailed description taken in conjunction with the accompanying drawings in which:

FIG. 8 is a diagram illustrating a similarity between a teacher model and a student model according to an example embodiment of the inventive concept;

DETAILED DESCRIPTION OF THE EMBODIMENTS

Figure 1:
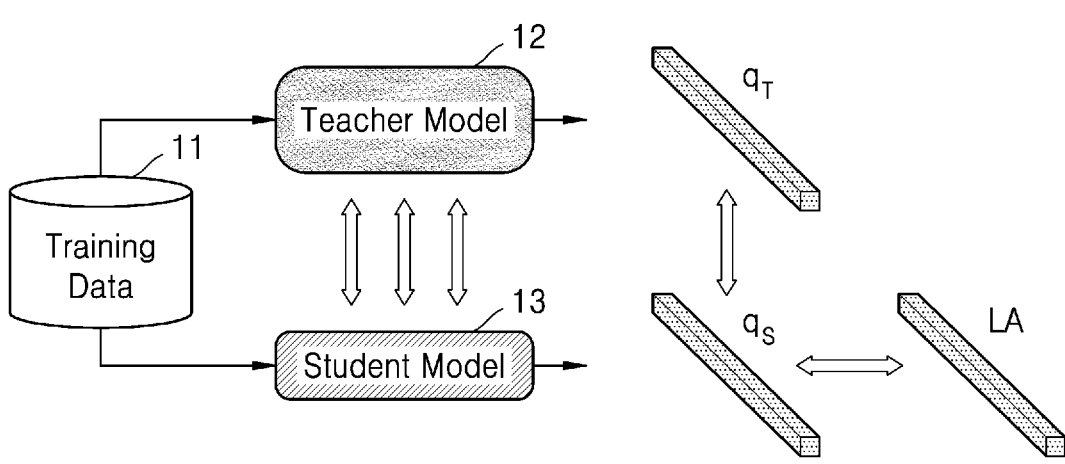
FIG. 1 is a diagram illustrating an example of model compression according to an example embodiment of the inventive concept.

For the purpose of promoting an understanding of the principles of the inventive concept, reference will now be made to example embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 1 is a diagram illustrating an example of model compression according to an example embodiment of the inventive concept. For instance, FIG. 1 shows an operation of training a student model 13 from training data 11 based on a teacher model 12 in a knowledge distillation as an example of model compression.

The knowledge distillation (or a knowledge extraction) may refer to a technology for effectively transferring knowledge of a large model to a small model. As shown in FIG. 1, in the knowledge distillation, the teacher model 12 may correspond to a large model, and the student model 13 may correspond to a small model. According to an example embodiment, the large model or the teacher model may referred to as a primary model and the small model or the student model may be referred to as a secondary model. The teacher model 12 may have a relatively high complexity (e.g., more layers, more parameters, and longer runtime) and high accuracy, and thus many resources (e.g., arithmetic units, memory, etc.) may be required in order to execute the teacher model 12. The student model 13 may have a relatively low complexity (e.g., fewer layers, fewer parameters, and shorter runtime), and thus the student model 13 may require fewer resources and may be easily utilized while may have a reduced accuracy. The student model 13 may be designed to run on a platform having limited resources, such as home appliances, mobile phones, and Internet of Things (IoT) devices, and thus it may be important to generate the student model 13 trained to provide a high accuracy even in limited resources.

In some example embodiments, the teacher model 12 and the student model 13 may process the training data 11 to generate a score with respect to each class in N predefined classes, where N is an integer greater than 1. The training data 11 may be an arbitrary data that may be classified into classes, and may include, for example, images or text segments. According to an example embodiment, the classes may be predefined or predetermined. In addition, each of the teacher model 12 and the student model 13 may refer to a machine learning model having an arbitrary structure that may be trained based on the training data 11. For example, each of the teacher model 12 and the student model 13 may include an artificial neural network, a decision tree, a support vector machine, a Bayesian network, and/or a genetic algorithm, etc. Hereinafter, the teacher model 12 and the student model 13 will be described mainly with reference to the artificial neural network, but it is noted that embodiments of the inventive concept are not limited thereto. The artificial neural network may include, as a non-limiting example, convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted boltzmann machine (RBM), fully convolutional network, long short-term memory (L-STM) network, classification network, etc.

The knowledge distillation may include two phases. In a first phase, the teacher model 12 may be trained based on the training data 11 and label data LA, and in a second phase, the student model 13 may be trained based on the training data 11, the teacher model 12, and the label data LA. The label data LA is an ideal result corresponding to the training data 11 and may represent classes to which inputs included in the training data 11 belong respectively. FIG. 1 shows an operation of training the student model 13 in the second phase of the knowledge distillation. As shown in FIG. 1, the teacher model 12 may output a soft output $q_T$ from the training data 11, and the student model 13 may generate a soft output $q_S$ from the training data 11. The soft outputs may include soft scores with respect to respective classes for a given input. Soft scores may define a score distribution in N classes, differently from hard scores aimed at a class to which the input belongs. For example, the teacher model 12 and the student model 13 may each include a final layer (which may be referred to as a softmax layer) for generating the soft outputs $q_T$ and $q_S$, and a soft score $q_i$ with respect to a class i in the soft output $q_T$ or $q_S$ may be defined as in [Equation 1] below.

$$q_i = \frac{\exp(z_i/T)}{\sum_j \exp(z_j/T)}(1 \le j \le N) \qquad \text{[Equation 1]}$$

In Equation 1, $z_i$ may be a weighted combination of outputs of a previous layer to the class i received in a final layer, and N may be the number of classes. In Equation 1, the soft score may be softened or stiffened by a temperature T, and the temperature T may have a higher value in a training phase, and may have a lower value after training is completed.

As described below with reference to the drawings, the teacher model 12 may be trained in consideration of a structure of the student model 13. Accordingly, the trained teacher model 12 may provide knowledge that is easy for the student model 13 to be trained, and may be referred to herein as a student-friendly teacher model. Due to the trained teacher model 12, that is, the student-friendly teacher model, the student model 13 may be effectively trained, and accordingly, the efficiency of model compression may be increased. In addition, due to the high efficiency of model compression, the student model 13 that provides high performance even on a platform with limited resources, that is, a machine learning model, may be driven, and the scope of use of the machine learning model may be easily expanded.

Figure 2:
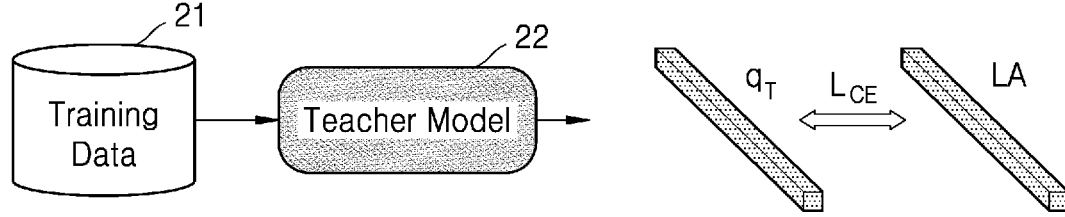
FIG. 2 is a diagram illustrating an example of model compression according to a comparative example.

FIG. 2 is a diagram illustrating an example of model compression according to a comparative example. Specifically, FIG. 2 shows an operation of learning a teacher model 22 according to the comparative example in a first phase of a knowledge distillation.

Referring to FIG. 2, the teacher model 22 may be trained independent of a student model. For example, as shown in FIG. 2, training data 21 may be provided to the teacher model 22, and the teacher model 22 may generate a soft output $q_T$. The teacher model 22 may be trained to minimize a loss function $L_{CE}$ based on a difference between the soft output $q_T$ and the label data LA. In some embodiments, the loss function $L_{CE}$ may define a cross-entropy loss depending on the difference between the soft output $q_T$ and the label data LA. Accordingly, the teacher model 22 may be trained independently of the student model to output an optimal result, that is, to have a high performance based on the label data LA.

As described above in FIG. 1, a distribution indicated by the soft output $q_T$ may include knowledge generated to identify a class to which an input belongs. A student model may be trained based on the soft output $q_T$ generated by the trained teacher model 22, and thus knowledge of the teacher model 22 may be transferred to the student model. However, the teacher model 22 may have a structure (e.g., the number of layers, the number of parameters, the size of features, a bit width, etc.) different from the student model, and accordingly, the high performance of the trained teacher model 22 may not guarantee the high performance of the student model. However, as will be described later with reference to the drawings, the teacher model may be trained based on the structure of the student model, and the trained teacher model, that is, a student-friendly teacher model, may provide the student model of a higher performance.

Figure 3:
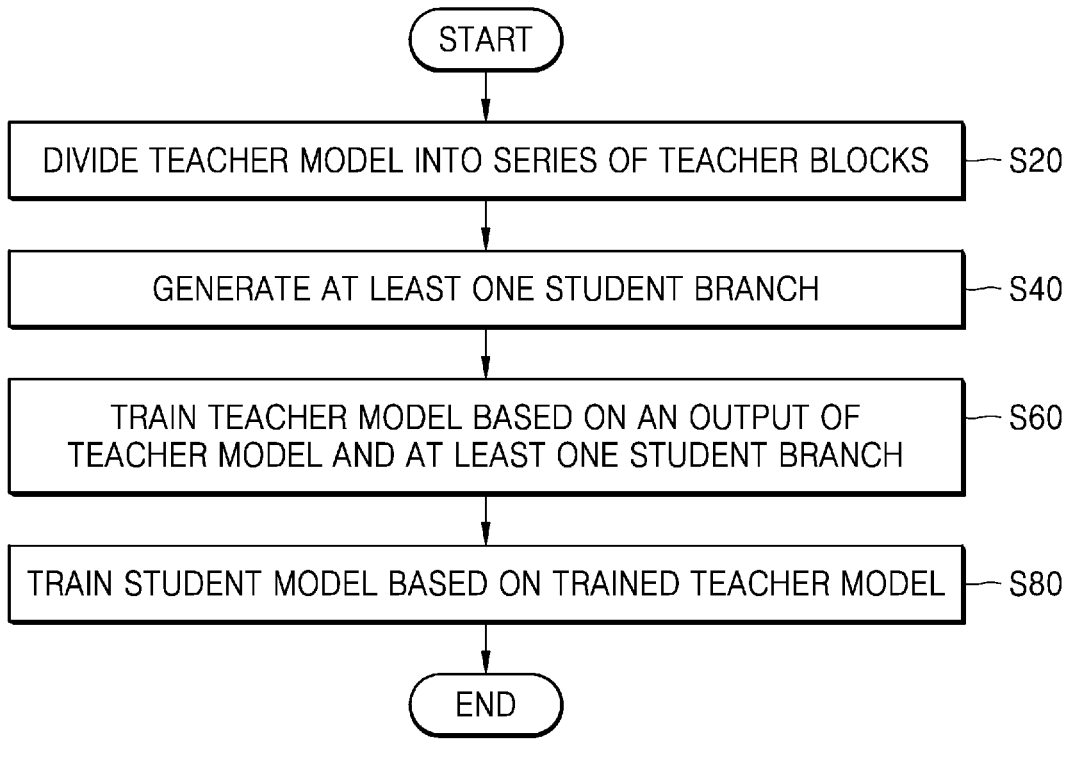
FIG. 3 is a flowchart illustrating a method of training a teacher model and a student model according to an example embodiment of the inventive concept.

FIG. 3 is a flowchart illustrating a method of training the teacher model 12 and the student model 13 according to an example embodiment of the inventive concept. As shown in FIG. 3, the method of training the teacher model and the student model may include a plurality of operations S20, S40, S60, and S80. Hereinafter, FIG. 3 will be described with reference to FIG. 1.

Referring to FIG. 3, in operation S20, the teacher model 12 may be divided into a series of blocks. For example, the teacher model 12 may include a plurality of layers, and each of the plurality of layers may process a feature generated by processing a feature output from a previous layer and provide the processed feature to a subsequent layer. Each of the series of blocks may include at least one of the plurality of layers, and may output the feature provided to the subsequent block. Herein, a block including at least one layer of the teacher model 12 may be referred to as a teacher block, and accordingly, the teacher model 12 may be divided into a series of teacher blocks. In some example embodiments, the teacher model 12 may be divided by automated machine learning (AutoML).

In some example embodiments, the teacher model 12 may be divided into the series of blocks based on training of the student model 13. For example, in a second phase of a knowledge distillation (i.e., training of the student model 13) described with reference to FIG. 1, the student model 13 may be trained based on the soft output $q_T$ of the teacher model 12 and the soft output $q_S$ of the student model 13 as well as features output from inner layers of the teacher model 12. The features output from the inner layers of the teacher model 12 may also include knowledge generated by the training data 11, and in order to generate the student model 13 close to the teacher model 12, features output from the inside of the teacher model 12 may be used. To this end, the teacher model 12 may be divided into a series of blocks each including at least one layer, and as illustrated by the arrows shown between the teacher model 12 and the student model 13 in FIG. 1, features output from each of the series of blocks may be used for training of the student model 13.

In operation S40, at least one student branch may be generated. The student branch may branch from the teacher model 12 and generate an output, such as a soft output, from features provided from the teacher model 12. The student branch may have a structure similar to that of the student model 13, and may include, for example, a layer having the same structure as the layer included in the student model 13. Similar to the teacher model 12 described above, the student model 13 may be divided into a series of blocks, each corresponding to a series of teacher blocks of the teacher model 12. Herein, a block including at least one layer of the student model 13 may be referred to as a student block, and accordingly, the student model 13 may be divided into a series of student blocks. The student branch may include a block having the same structure as at least one student block of the student model 13, and the at least one block included in the student branch may correspond to at least one teacher block of the teacher model 12. Examples of the student branch will be described later with reference to FIG. 4.

In operation S60, the teacher model 12 may be trained based on one or more outputs of the teacher model 12 and the at least one student branch. As described above, the student branch generated in operation S40 may have a structure similar to that of the student model 13, and the output (e.g., the soft output) of the student branch may be used for training of the teacher model 12, and thus the teacher model 12 may be trained in a student-friendly manner, which is different from the independently trained teacher model 22 of FIG. 2. In some example embodiments, a plurality of loss functions may be used in training of the teacher model 12, and an example of operation S60 will be described later with reference to FIG. 5.

In operation S80, the student model 13 may be trained based on the trained teacher model 12. According to an example embodiment, since the teacher model 12 trained in the student-friendly manner in operation S60, knowledge that is easy for the student model 13 to learn may be provided from the teacher model 12 to the student model 13, and accordingly, the performance of the student model 13 may be improved. According to an example embodiment, the knowledge may be features that are easy for the student model 13 to learn. An example of operation S80 will be described later with reference to FIG. 7.

Figure 9:
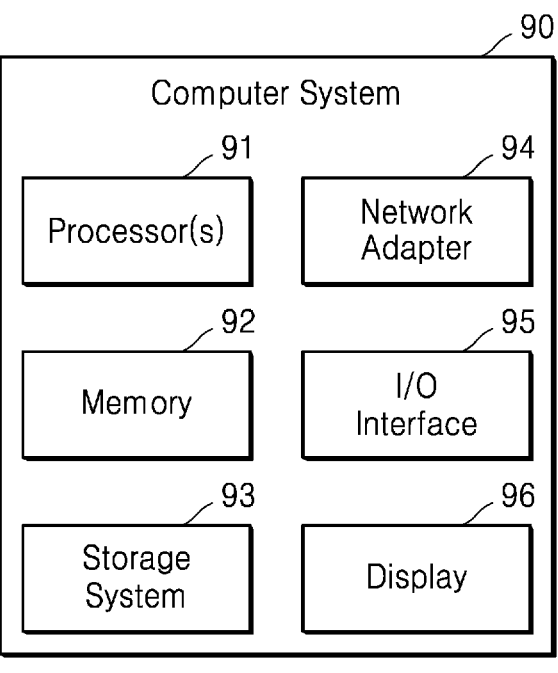
FIG. 9 is a block diagram illustrating a computer system according to an example embodiment of the inventive concept.

In some example embodiments, the method of FIG. 3 may be performed by a computer system (e.g., 90 of FIG. 9). For example, the computer system may include a memory and at least one processor, and the at least one processor may perform the method of FIG. 3 by executing a series of instructions stored in the memory. Further, in some example embodiments, a non-transitory computer-readable storage medium storing the series of instructions that cause the method of FIG. 3 to be performed when executed by the processor may be provided. For example, the non-transitory computer-readable storage medium may include a semiconductor memory device such as a flash memory, or an optical disc such as a compact disc (CD), a digital versatile disc or digital video disc (DVD), or a Blu-ray disc, etc., a magnetic disc, and the like.

Figure 4:
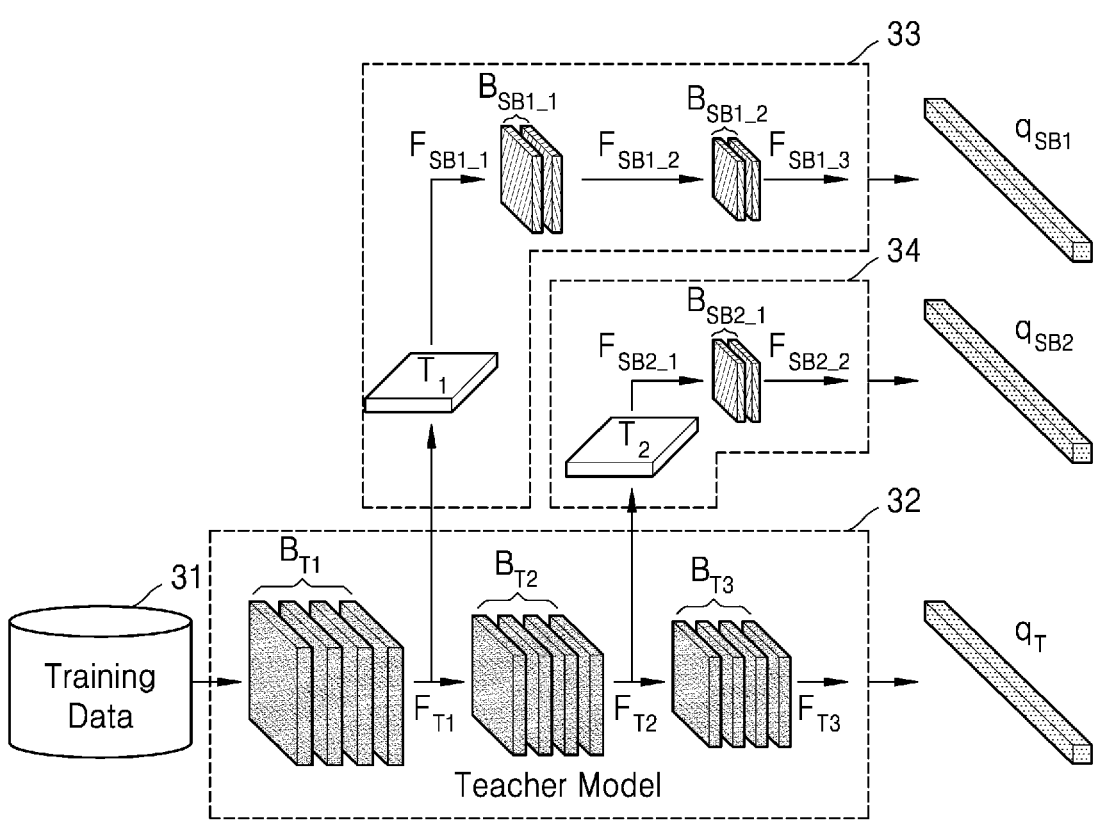
FIG. 4 is a diagram illustrating an example of model compression according to an example embodiment of the inventive concept.

FIG. 4 is a diagram illustrating an example of model compression according to an example embodiment of the inventive concept. For instance, FIG. 4 shows an operation of training a teacher model 32 using a student branch from training data 31 in a knowledge distillation as the example of model compression. In the example of FIG. 4, the teacher model 32 may be trained based on a first student branch 33 and a second student branch 34.

As described above with reference to FIG. 3, the teacher model 32 may be divided into a plurality of teacher blocks. For example, as shown in FIG. 4, the teacher model 32 may be divided into a first teacher block $B_{T1}$, a second teacher block $B_{T2}$, and a third teacher block $B_{T3}$, and each of the first teacher block $B_{T1}$, the second teacher block $B_{T2}$, and the third teacher block $B_{T3}$ may include at least one layer. The first teacher block $B_{T1}$ may provide a first teacher feature $F_{T1}$ to the second teacher block $B_{T2}$ by processing the training data 31, the second teacher block $B_{T2}$ may provide a second teacher feature $F_{T2}$ to the third teacher block $B_{T3}$ by processing the first teacher feature $F_{T1}$, and the third teacher block $B_{T3}$ may generate a third teacher feature $F_{T3}$ by processing the second teacher feature $F_{T2}$. In some embodiments, the teacher model 32 may further include a softmax layer, and the softmax layer may generate the soft output $q_T$ of the teacher model 32 from the third teacher feature $F_{T3}$. In some embodiments, the teacher model 32 may be divided into a different number of teacher blocks from that shown in FIG. 4.

A student branch may include at least one student block. For example, as shown in FIG. 4, a first student branch 33 may include a first student block $B_{SB1\_1}$ and a second student block $B_{SB1\_2}$. In addition, the second student branch 34 may include a third student block $B_{SB2\_1}$. As shown in FIG. 4, the student block may have a lower complexity (e.g., fewer layers and smaller layer size) than the teacher block. In addition, as shown in FIG. 4, the student branch may receive a feature, that is, the teacher feature, from the teacher block included in the teacher model 32, and the number of student blocks included in the student branch may be identical to the number of teacher blocks following the teacher block providing the teacher feature.

Referring to FIG. 4, the first student branch 33 may receive the first teacher feature $F_{T1}$ from the teacher model 32, and generate a soft output $q_{SB1}$ of the first student branch 33 by processing the first teacher feature $F_{T1}$. In order to process the first teacher feature $F_{T1}$, the first student branch 33 may include a first transformation layer $T_1$. As shown in FIG. 4, the first transform layer $T_1$ may receive the first teacher feature $F_{T1}$, and may transform the first teacher feature $F_{T1}$ into a first student branch feature $F_{SB1\_1}$ having a format (e.g., a format $F_{S1}$ in FIG. 7) processible by a student block, that is, the first student block $B_{SB1\_1}$. In some embodiments, the first transform layer $T_1$ may transform the first teacher feature $F_{T1}$ into the first student branch feature $F_{SB1\_1}$ using a convolution layer.

The first student block $B_{SB1\_1}$ may have the same structure (e.g., the same layers) as a student block (e.g., $B_{S2}$ of FIG. 7) corresponding to the second teacher block $B_{T2}$ in a student model, and may output the second student branch feature $F_{SB1\_2}$ by processing the first student branch feature $F_{SB1\_1}$. In addition, the second student block $B_{SB1\_2}$ may have the same structure as a student block (e.g., $B_{S3}$ in FIG. 7) corresponding to the third teacher block $B_{T3}$ of the teacher model 32 in the student model, and may output the third student branch feature $F_{SB1\_3}$ by processing the second student branch feature $F_{SB1\_2}$. Accordingly, the first teacher feature $F_{T1}$ output from the first teacher block $B_{T1}$ may be processed by the first student block $B_{SB1\_1}$ and the second student block $B_{SB1\_2}$ respectively corresponding to the second teacher block $B_{T2}$ and the third teacher block $B_{T3}$ in the first student branch 33. As a result, the soft output $q_{SB1}$ of the first student branch 33 may correspond to a result partially processed by each of the teacher model 32 and the student model.

Referring to FIG. 4, the second student branch 34 may receive the second teacher feature $F_{T2}$ from the teacher model 32, and may generate a soft output $q_{SB2}$ of the second student branch 34 by processing the second teacher feature $F_{T2}$. In order to process the second teacher feature $F_{T2}$, the second student branch 34 may include a second transformation layer $T_2$. As shown in FIG. 4, the second transform layer $T_2$ may receive the second teacher feature $F_{T2}$, and may transform the second teacher feature $F_{T2}$ into a fourth student branch feature $F_{SB2\_1}$ having a format (e.g., a format $F_{S2}$ in FIG. 7) processible by a student block, that is, the third student block $B_{SB2\_1}$.

The third student block $B_{SB2\_1}$ may have the same structure (e.g., the same layers) as the student block (e.g., $B_{S3}$ in FIG. 7) corresponding to the third teacher block $B_{T3}$ in the student model, and may output a fifth student branch feature $F_{SB2\_2}$ by processing the fourth student branch feature $F_{SB2\_1}$. Accordingly, the second teacher feature $F_{T2}$ output from the second teacher block $B_{T2}$ may be processed by the third student block $B_{SB2\_1}$ corresponding to the third teacher block $B_{T3}$ in the second student branch 34. As a result, the soft output $q_{SB2}$ of the second student branch 34 may correspond to a result partially processed by each of the teacher model 32 and the student model. Herein, the first teacher feature $F_{T1}$, the second teacher feature $F_{T2}$, and the third teacher feature $F_{T3}$ of the teacher model 32 may be referred to as student-friendly features.

In addition to the soft output $q_T$ of the teacher model 32, a soft output $q_{SB1}$ of the first student branch 33 and a soft output $q_{SB2}$ of the second student branch 34 may be used for training. Accordingly, parameters of the first teacher block $B_{T1}$, the second teacher block $B_{T2}$, and the third teacher block $B_{T3}$ of the teacher model 32 may be trained, parameters of the first student block $B_{SB1\_1}$ and the second student block $B_{SB1\_2}$ of the first student branch 33 may be trained, and parameters of the third student block $B_{SB2\_1}$ of the second student branch 34 may be trained. The above-described parameters may be trained based on an arbitrary technology, such as a gradient decent technology, for the purpose of reducing loss. Examples of training based on the soft outputs $q_T$, $q_{SB1}$, and $q_{SB2}$ will be described later with reference to FIGS. 5 and 6.

Figure 5:
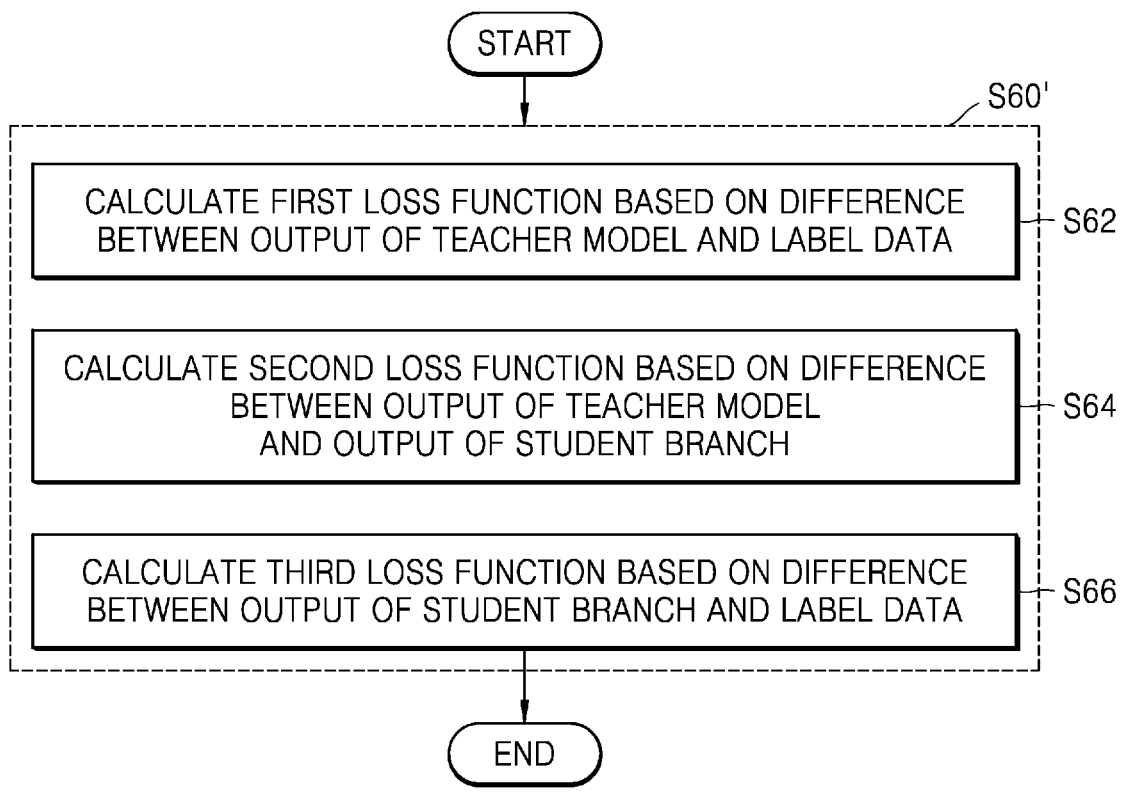
FIG. 5 is a flowchart illustrating a method of training a teacher model and a student model according to an example embodiment of the inventive concept.

FIG. 5 is a flowchart illustrating a method of training a teacher model and a student model according to an example embodiment of the inventive concept. For instance, FIG. 5 shows an example of operation S60 of FIG. 3. As described above with reference to FIG. 3, in operation S60' of FIG. 5, the teacher model may be trained based on outputs of the teacher model and at least one student branch. As shown in FIG. 5, operation S60' may include a plurality of operations S62, S64, and S66. The plurality of operations S62, S64, and S66 included in operation S60' may be performed sequentially or may be performed in parallel.

Referring to FIG. 5, in operation S62, a first loss function may be calculated based on a difference between the output of the teacher model and label data. For example, the first loss function may define a cross-entropy loss depending on the difference between the output of the teacher model and the label data. The teacher model and the student branch may be trained in a direction in which the first loss function decreases, and accordingly, the performance of the teacher model may be improved.

In operation S64, a second loss function may be calculated based on a difference between an output of the teacher model and an output of the student branch. For example, the second loss function may be based on a difference between a distribution of soft scores indicated by the soft output of the teacher model and a distribution of soft scores indicated by the soft output of the student branch. The teacher model and the student branch may be trained in a direction in which the second loss function decreases, and accordingly, the distribution of soft scores indicated by the soft output of the teacher model may be influenced by a structure of the student model, and the teacher model may be prevented from being heterogeneous from the student model. In some embodiments, the second loss function may define a Kullback-Leibler divergence (KLD) loss that depends on the difference between the output of the teacher model and the output of the student branch. As described above with reference to FIG. 4, when a plurality of student branches are connected to the teacher model, the second loss function corresponding to each of the plurality of student branches may be calculated.

In operation S66, a third loss function may be calculated based on the difference between the output of the student branch and the label data. For example, the third loss function may define a cross-entropy loss depending on the difference between the soft output of the student branch and the label data. The teacher model and the student branch may be trained so that the third loss function decreases, and accordingly, a teacher feature (or a student-friendly feature) to be trained by the student model in the future may be trained.

Figure 6:
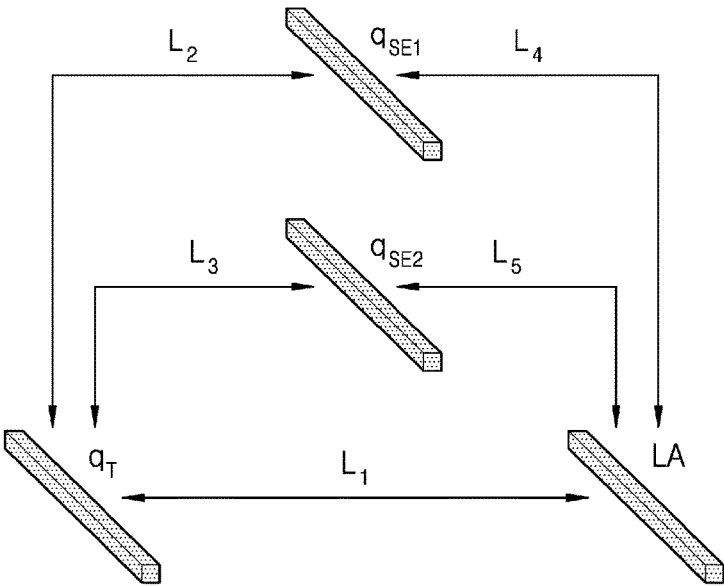
FIG. 6 is a diagram illustrating an operation of training a teacher model according to an example embodiment of the inventive concept.

FIG. 6 is a diagram illustrating an operation of training the teacher model 32 according to an example embodiment of the inventive concept. For instance, FIG. 6 shows losses calculated based on the soft output $q_T$ of the teacher model 32, the soft output $q_{SB1}$ of the first student branch 33, the soft output $q_{SB2}$ of the second student branch 34, and the label data LA of FIG. 4. In some embodiments, the losses shown in FIG. 6 may be calculated in operation S60' of FIG. 5, and hereinafter, FIG. 6 will be described with reference to FIGS. 4 and 5.

A first loss $L_1$ based on a difference between the soft output $q_T$ of the teacher model 32 and the label data LA may be calculated. For example, the first loss $L_1$ may be calculated in operation S62 of FIG. 5 and may correspond to a cross-entropy loss. As described above with reference to FIG. 5, the first loss $L_1$ may correspond to a performance of the teacher model 32, and the teacher model 32 may be trained to reduce the first loss $L_1$.

A second loss $L_2$ may be calculated based on a difference between the soft output $q_T$ of the teacher model 32 and the soft output $q_{SB1}$ of the first student branch 33. In addition, a third loss $L_3$ may be calculated based on a difference between the soft output $q_T$ of the teacher model 32 and the soft output $q_{SB2}$ of the second student branch 34. For example, the second loss $L_2$ and the third loss $L_3$ may be calculated in operation S64 of FIG. 6. As described above with reference to FIG. 5, the second loss $L_2$ and the third loss $L_3$ may correspond to a degree of heterogeneity between the teacher model 32 and the student model, and the teacher model 32 may be trained to reduce the second loss $L_2$ and the third loss $L_3$.

A fourth loss $L_4$ may be calculated based on the soft output $q_{SB1}$ of the first student branch 33 and the label data LA. In addition, the fifth loss $L_5$ may be calculated based on the soft output $q_{SB2}$ of the second student branch 34 and the label data LA. For example, the fourth loss $L_4$ and the fifth loss $L_5$ may be calculated in operation S66 of FIG. 6. As described above with reference to FIG. 5, the teacher model 32 may be trained to reduce the fourth loss $L_4$ and the fifth loss $L_5$, and accordingly, the first teacher feature $F_{T1}$ and second teacher feature $F_{T2}$, which are student-friendly, may be trained.

Figure 7:
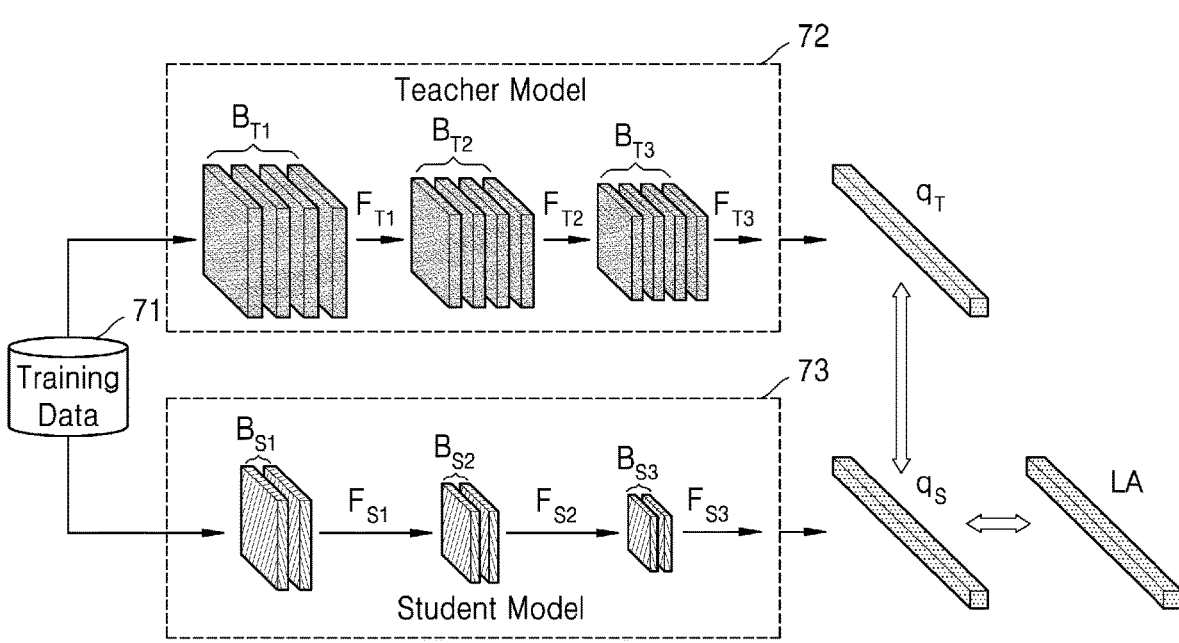
FIG. 7 is a diagram illustrating an example of model compression according to an example embodiment of the inventive concept.

FIG. 7 is a diagram illustrating an example of model compression according to an embodiment of the inventive concept. For instance, FIG. 1 shows an operation of training a student model 73 from training data 71 based on a teacher model 72 trained to be student-friendly.

Referring to FIG. 7, the trained teacher model 72 may generate the soft output $q_T$ by processing the training data 71, and may include the first teacher block $B_{T1}$, the second teacher block $B_{T2}$, and the third teacher blocks $B_{T3}$. The first teacher block $B_{T1}$ may provide the first teacher feature $F_{T1}$ to the second teacher block $B_{T2}$ by processing the training data 71, the second teacher block $B_{T2}$ may provide the second teacher feature $F_{T2}$ to the third teacher block $B_{T3}$ by processing the first teacher feature $F_{T1}$, and the third teacher block $B_{T3}$ may generate the third teacher feature $F_{T3}$ by processing the second teacher feature $F_{T2}$.

The student model 73 may generate the soft output $q_S$ by processing the training data 71, and may include a first student block $B_{S1}$, a second student block $B_{S2}$, and a third student block $B_{S3}$ respectively corresponding to the first teacher block $B_{T1}$, the second teacher block $B_{T2}$, and the third teacher blocks $B_{T3}$. The first student block $B_{S1}$ may provide the first student feature $F_{S1}$ to the second student block $B_{S2}$ by processing the training data 71, the second student block $B_{S2}$ may provide the second student feature $F_{S2}$ to the third student block $B_{S3}$ by processing the first student feature $F_{S1}$, and the third student block $B_{S3}$ may generate the third student feature $F_{S3}$ by processing the second student feature $F_{S2}$.

The student model 73 may be trained based on the soft output $q_T$ of the teacher model 72, the soft output $q_S$ of the student model 73, and label data. For example, a loss based on a difference between the soft output $q_S$ of the student model 73 and the label data may be calculated, and a loss based on a difference between the soft output $q_S$ of the student model 73 and the soft output $q_T$ of the teacher model 72 may be calculated. Further, the student model 73 may be trained based on teacher features and student features that correspond to each other. For example, as shown in FIG. 7, the student model 73 may be trained such that the first student feature $F_{S1}$, the second student feature $F_{S2}$, and the third student feature $F_{S3}$ are respectively close to the first teacher feature $F_{T1}$, the second teacher feature $F_{T2}$ and the third teacher feature $F_{T3}$.

As described above with reference to the drawings, the teacher model 72 may be trained using at least one student branch, and accordingly, not only the soft output $q_T$ of the trained teacher model 72 but also the first teacher feature $F_{T1}$, the second teacher feature $F_{T2}$ and the third teacher feature $F_{T3}$ may be student-friendly. As will be described later with reference to FIG. 8, the student model 73 trained based on the teacher model 72, which is student-friendly, may have improved performance.

FIG. 8 is a diagram illustrating a similarity between a teacher model and a student model according to an example embodiment of the inventive concept. For instance, a table of FIG. 8 shows the degree of similarity between the teacher model and the student model in each of a case (w/o Student Friendly Teacher Network (SFTN)) based on the teacher model trained independently from the student model and a case (SFTN) based on the student-friendly trained teacher model described above with reference to the drawings.

Referring to FIG. 8, "resnet32×4" may be used as the teacher model, and "ShuffleV2" may be used as the student model. In addition, the teacher model and the student model may be compared using training data described in the leftmost column of the table of FIG. 8. Among metrics for measuring the similarity between the teacher model and the student model, Kullback-Leibler (KL) may depend on a difference between a distribution of a Cifar100 test set output of the teacher model and a distribution of a Cifar100 test set output of the student model, as the value of KL decreases, the teacher model and the student model may be considered to be similar. In addition, Center-Kernel-Alignment (CKA) may depend on a similarity between the Cifar100 test set output of the teacher model and the Cifar100 test set output of the student model, as the value of CKA increases, the teacher model and the student model may be considered to be similar.

As shown in FIG. 8, a case where a teacher model trained using at least one student branch, that is, the student-friendly teacher model is used (SFTN) may have lower KL values and higher CKA values than a case where the teacher model trained independently from the student model is used (w/o SFTN). For example, when the student-friendly teacher model is used (SFTN), a KL average is about 0.41, a CKA average is 0.95, while otherwise (w/o SFTN), the KL average may be about 0.86, and the CKA average may be about 0.89. Accordingly, it may be seen that knowledge and/or features of the teacher model are better transferred to the student model due to the student-friendly teacher model.

FIG. 9 is a block diagram illustrating a computer system 90 according to an example embodiment of the inventive concept. In some example embodiments, the computer system 90 of FIG. 9 may perform training of a teacher model and/or a student model described above in FIGS. 1 and 3-8, and may be referred to as a model training system, a knowledge distillation system, etc.

The computer system 90 may refer to an arbitrary system including a general purpose or special purpose computing system. For example, the computer system 10 may include a personal computer, a server computer, a laptop computer, a home appliance, etc. As shown in FIG. 9, the computer system 90 may include at least one processor 91, a memory 92, a storage system 93, a network adapter 94, an input/output interface 95, and a display 96.

The at least one processor 91 may execute a program module including computer system executable instructions.

The program module may include routines, programs, objects, components, logic, data structures, etc. that perform particular tasks or implement particular abstract data types. The memory 92 may include a computer system readable medium in the form of volatile memory such as random access memory (RAM). The at least one processor 91 may access the memory 92 and execute instructions loaded in the memory 92. The storage system 93 may store information in a non-volatile manner. In some example embodiments, storage system 93 may include at least one program product including a program module configured to perform training of the teacher model and/or the student model described above in FIGS. 1 and 3-8. According to an example embodiment, the program may include an operating system, at least one application, other program modules, and program data.

The network adapter 94 may provide access to a local area network (LAN), a wide area network (WAN), and/or a public network (e.g., the Internet), etc. The input/output interface 95 may provide a communication channel with peripheral devices such as a keyboard, a pointing device, and an audio system. The display 96 may output various information so that a user may check the information.

In some example embodiments, training of the teacher model and/or the student model described above in FIGS. 1 and 3-8 may be implemented as a computer program product. The computer program product may include a computer-readable medium (or storage medium) including computer-readable program instructions for causing the at least one processor 91 to perform training of the teacher model and/or the student model. Computer-readable instructions may include, as non-limiting examples, assembler instructions, instruction set architecture (ISA) instructions, machine instructions, machine-dependent instructions, microcode, firmware instructions, state setting data, or source code or an object code written in at least one programming language.

The computer-readable medium may be an arbitrary tangible medium capable of non-transitory holding and storing instructions executed by the at least one processor 91 or an arbitrary instruction executable device. The computer-readable medium may be an electronic storage device, a magnetic storage device, an optical storage device, an electromagnetic storage device, a semiconductor storage device, or an arbitrary combination thereof, but is not limited thereto. For example, the computer-readable medium may be a portable computer diskette, hard disk, random access memory (RAM), read-only memory (ROM), electrically erasable read only memory (EEPROM), flash memory, static random access memory (SRAM), CD, DVD, memory stick, floppy disk, a mechanically encoded device such as a punch card, or an arbitrary combination thereof.

Figure 10:
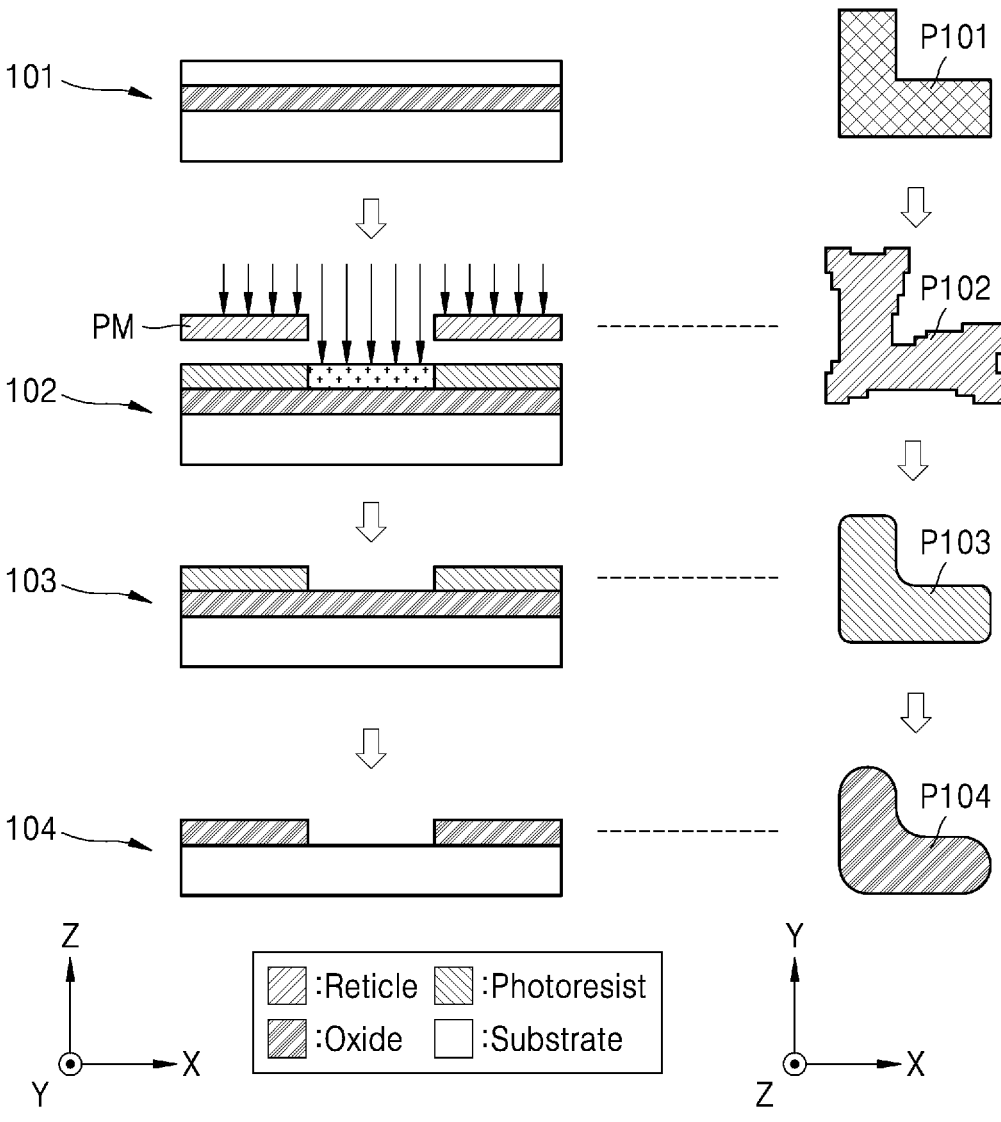
FIG. 10 is a diagram illustrating a process of manufacturing an integrated circuit by a semiconductor process according to an example embodiment of the inventive concept.

FIG. 10 is a diagram illustrating a process of manufacturing an integrated circuit by a semiconductor process according to an example embodiment of the inventive concept. For instance, the left side of FIG. 10 sequentially shows cross-sectional views of a structure formed by the semiconductor process, and the right side of FIG. 10 sequentially shows plan views of the structure formed by the semiconductor process. As shown in FIG. 10, an integrated circuit may include patterns formed on a plurality of layers stacked in the Z-axis direction.

The semiconductor process may include various sub-processes for forming patterns included in the integrated circuit. For example, the semiconductor process may include photolithography, and photolithography may refer to a process of forming a pattern by transferring a geometric pattern from a photomask to a photosensitive chemical photoresist using light. The photoresist may include a positive photoresist in which a part irradiated with light is dissolved by a developer and a negative photoresist in which a part not irradiated with light is dissolved by the developer, and FIG. 10 shows an example of photolithography for forming a first pattern P11 having an "L" shape on an oxide layer using the positive photoresist. A pattern having an optimal shape desired by a designer, such as the first pattern P11, may be referred to as an ideal pattern. Although FIG. 10 shows an example of forming the pattern on the oxide layer, it is noted that the pattern may be formed to other layers, such as an active layer, a metal layer, etc. in a similar manner.

Referring to the left side of FIG. 10, a first structure 101 may include a substrate, an oxide layer, and a photoresist layer that are sequentially stacked. For example, the oxide layer may be formed on a cleaned wafer, and a positive photoresist may be applied on the oxide layer. In some embodiments, the positive photoresist may be applied on the oxide layer by spin coating. In some embodiments, after the photoresist is applied, the wafer may be heated to remove an excess solvent.

A photomask PM may be aligned on the first structure 101, and a second structure 102 may be formed by irradiating light to the aligned photomask PM. As shown in FIG. 10, the positive photoresist exposed to light in the photoresist layer may be chemically modified. In some embodiments, the photomask PM may be referred to as a reticle and may include a material that is formed on or below a glass layer through which light may be transmitted, and does not transmit light, such as chromium (Cr). Light passing through an opening of the photomask PM may diffract, and optical proximity correction (OPC) may be employed to compensate for an error caused by the diffraction of light. For example, as shown on the right side of FIG. 10, in order to form the first pattern P101, a second pattern P102 to which OPC is applied may be formed on the photomask PM, and may have a different shape from the first pattern P101. The second pattern P102 may have a shape designed in consideration of OPC, etc., and may be referred to as a design pattern.

A developer may be provided to the second structure 102, and accordingly, a part of the photoresist layer irradiated with light may be dissolved by the developer and removed from the second structure 102. Accordingly, as shown in FIG. 1, a third pattern P103 may be formed on the photoresist layer. A process of removing a part of the photoresist layer chemically modified by light through the developer may be referred to as developing, and a structure in which developing is completed, that is, the third structure 103, may be referred to as being in an after develop inspection (ADI) state, and the third pattern P103 may be referred to as a pattern in the ADI state. In some embodiments, the developer may be provided by a spinner like the photoresist.

Etching may be performed on the third structure 103, and accordingly, a part of the oxide layer that is not protected by the photoresist may be etched. Etching may include wet (or liquid) etching and dry (or plasma) etching, and may be used to remove a part of the uppermost layer that is not protected by the photoresist. After etching is completed, the photoresist may be removed, and accordingly, a fourth pattern P104 may be formed on the oxide layer, as shown in FIG. 10. A process of removing the photoresist may be referred to as cleaning, a structure in which cleaning is completed, that is, a fourth structure 104, may be referred to as being in an after clean inspection (ACI) state, and may be referred to as a pattern in the ACI state. In some embodiments, the wafer may be heated to remove a residual solvent. As described above, the third pattern P103 and the fourth pattern P104 may respectively correspond to patterns actually formed by sub-processes, and may be referred to as physical patterns.

As shown in FIG. 10, the shape of the pattern may change as sub-processes are performed, which may be modeled as a transformation of the pattern. For example, the first pattern P101 corresponding to the ideal pattern may be transformed into the second pattern P102 by applying OPC, and the second pattern P102 may be transformed into the third pattern P103 in the ADI state by irradiation and development. Also, the third pattern P103 may be transformed into the fourth pattern P104 in the ACI state by etching and cleaning. As a result, the fourth pattern P104 may have an ideal pattern, that is, a shape different from the first pattern P101, and it may be important to determine the shape of the pattern P102 such that the fourth pattern P104 has a shape most similar to the first pattern P110.

By simulating the error caused by the diffraction of light passing through the photomask PM, estimating the pattern of the ADI state (i.e., the third pattern P103) from a pattern on the photomask PM (i.e. the second pattern P102) may be referred to as an optical rule check (ORC). Although the third pattern P103, that is, the pattern of the photoresist layer, may be estimated by ORC, there may be limitations in estimating the fourth pattern P104 formed after etching and cleaning by ORC as well as the accuracy of simulation. Although OPC also simulates the error caused by the diffraction of light so that the second pattern P102 for forming the third pattern P103 in the ADI state may be estimated, there may be limitations in estimating the second pattern P102 in consideration of the final fourth pattern P104 as well as the accuracy of simulation.

In some embodiments, a trained student model as described above FIGS. 1 and 3-8 may be used to model the semiconductor process illustrated in FIG. 10. For example, images of a design pattern of an integrated circuit manufactured by the semiconductor process and/or images of a physical pattern may be provided to a teacher model as training data, and the teacher model may be trained in a student-friendly manner. In addition, images of design patterns and/or images of physical patterns of the integrated circuit may be provided to the trained teacher model and student model as training data, and a student model providing a high performance may be trained. Accordingly, based on limited resources, various phenomena generated by the design pattern may be accurately estimated, and various factors that cause the physical pattern may be accurately estimated. As a result, productivity and reliability of the integrated circuit may be improved.

Figure 11:
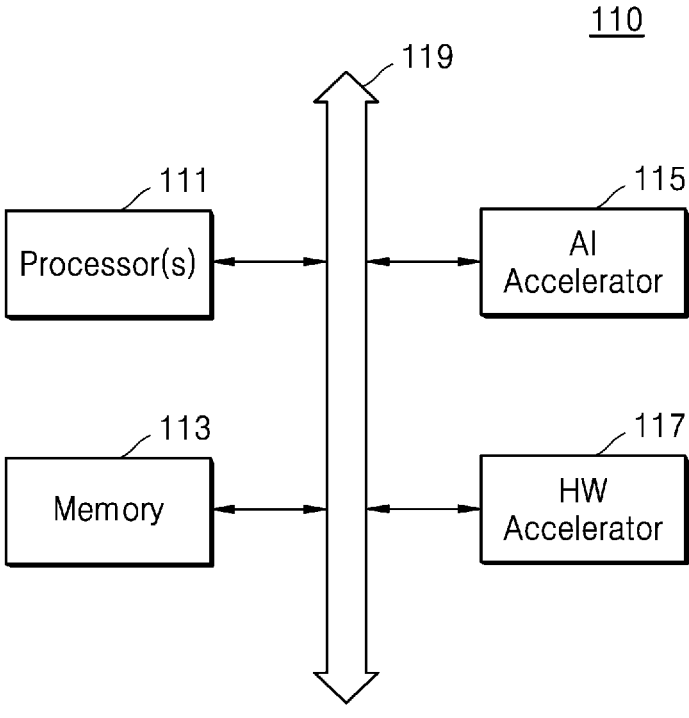
FIG. 11 is a block diagram showing a device according to an example embodiment of the inventive concept.

FIG. 11 is a block diagram showing a device 110 according to an embodiment of the inventive concept. In some embodiments, a trained student model according to an embodiment of the inventive concept may be executed on the device 110. Accordingly, the device 110 may execute a machine learning model of a high performance using limited resources, and may easily provide various and useful functions based on the machine learning model.

Referring to FIG. 11, the device 110 may include at least one processor 111, a memory 113, an artificial intelligence (AI) accelerator 115 and a hardware accelerator 117, and the at least one processor 111, the memory 113, the AI accelerator 115, and the hardware accelerator 117 may communicate with each other via a bus 119. In some example embodiments, the at least one processor 111, the memory 113, the AI accelerator 115, and the hardware accelerator 117 may be included in one semiconductor chip. In addition, in some example embodiments, at least two of the at least one processor 111, the memory 113, the AI accelerator 115, and the hardware accelerator 117 may be respectively included in two or more semiconductor chips mounted on a board.

The at least one processor 111 may execute instructions. For example, the at least one processor 111 may execute an operating system by executing instructions stored in the memory 113 or may execute applications executed on the operating system. In some embodiments, the at least one processor 111 may instruct the AI accelerator 115 and/or the hardware accelerator 117 to perform a task by executing instructions, and may obtain a result of performing the task from the AI accelerator 115 and/or the hardware accelerator 117. In some embodiments, the at least one processor 111 may be an Application Specific Instruction Set Processor (ASIP) customized for a specific use, and may support a dedicated instruction set.

The memory 113 may have an arbitrary structure storing data. For example, the memory 113 may include a volatile memory device such as a dynamic random access memory (DRAM), a static random access memory (SRAM), etc. and a non-volatile memory such as a flash memory, a resistive random access memory (RRAM), etc. The at least one processor 111, the AI accelerator 115 and the hardware accelerator 117 may store data (e.g., IN, IMG_I, IMG_O, and OUT in FIG. 2) in the memory 113 through the bus 119 or may read the data (e.g., IN, IMG_I, IMG_O, and OUT in FIG. 2) from the memory 113.

The AI accelerator 115 may refer to hardware designed for AI applications. In some embodiments, the AI accelerator 115 may include a Neural Processing Unit (NPU) for implementing a neuromorphic structure, may generate output data by processing input data provided from the at least one processor 111 and/or the hardware accelerator 117, and may provide the output data to the at least one processor 111 and/or the hardware accelerator 117. In some embodiments, the AI accelerator 115 may be programmable and may be programmed by the at least one processor 111 and/or the hardware accelerator 117.

The hardware accelerator 117 may refer to hardware designed to perform a specific task at high speed. For example, the hardware accelerator 117 may be designed to perform data conversion such as demodulation, modulation, encoding, and decoding at high speed. The hardware accelerator 117 may be programmable and may be programmed by the at least one processor 111 and/or the hardware accelerator 117.

In some embodiments, the AI accelerator 115 may execute the trained student model based on the student-friendly teacher model. The AI accelerator 115 may generate an output including useful information by processing an arbitrary input, such as an image, a text segment, or a sound sample. Further, in some embodiments, at least a part of the student model executed by the AI accelerator 115 may be executed by the at least one processor 111 and/or the hardware accelerator 117.

While the inventive concept has been particularly shown and described with reference to embodiments thereof, it will be understood that various changes in form and details may be made therein without departing from the spirit and scope of the following claims.

What is claimed is:

1. A training system comprising:
   a memory storing instructions; and
   at least one processor configured to access the memory and execute the instructions to:

divide a teacher model into a plurality of teacher blocks each comprising a plurality of layers, the plurality of teacher blocks comprising a first teacher block, a second teacher block and a third teacher block;
   generate a first student branch, which receives a first feature output from the first teacher block, the first student branch comprising a first student branch block corresponding to the second teacher block and a second student branch block corresponding to the third teacher block;
   train the teacher model based on one or more outputs of the teacher model and a first output of the first student branch by inputting images of a design pattern or a physical pattern of an integrated circuit as training data;
   train a student model comprising a plurality of student blocks based on the trained teacher model by inputting images of the design pattern or the physical pattern of the integrated circuit as training data, the plurality of student blocks comprising a first student block corresponding to the first teacher block, a second student block corresponding to the second teacher block and a third student block corresponding to the third teacher block; and
   model a semiconductor process based on the trained student model,
   wherein the first student branch is generated separately from the plurality of student blocks of the student model, and
   wherein the first student branch has a structure that replicates the student model by configuring the first student branch block to have a same number of layers, a same number of parameters, a same size of feature, and a same bitwidth as the first student block and configuring the second student branch block to have a same number of layer, a same number of parameters, a same size of feature, and a same bitwidth as the third student block,
   wherein the first student branch comprises a first artificial neural network,
   wherein the student model comprises a second artificial neural network,
   wherein each of the plurality of student blocks of the student model has a lower complexity than a corresponding teacher block, among the plurality of teacher blocks in the teacher model or requires fewer resources than the corresponding teacher block in the teacher model,
   wherein the first student branch comprises a transformation layer configured to transform the first feature output from the first teacher block into a first student branch feature having a format processible by the first student block, and
   wherein the first output of the first student branch is a result that is partially processed by each of the teacher model and the student model represented by the first student branch.

2. The training system of claim 1, wherein a number of student blocks included in the first student branch is same as a number of teacher blocks following the first teacher block among the plurality of teacher blocks, and
   wherein the plurality of teacher blocks is in a series.

3. The training system of claim 2, wherein the second teacher block follows the first teacher block among the plurality of teacher blocks.

4. The training system of claim 1, wherein the at least one processor is further configured to execute the instructions to:

generate a second student branch, which receives a second feature output from the second teacher block among the plurality of teacher blocks; and train the teacher model based on the one or more outputs of the teacher model, the first output of the first student branch, and a second output of the second student branch, wherein the second student branch corresponds to at least one second student block among the plurality of student blocks.

5. A computer-implemented training method comprising:

dividing a teacher model into a plurality of teacher blocks each comprising a plurality of layers, the plurality of teacher blocks comprising a first teacher block, a second teacher block and a third teacher block;

generating a first student branch, which receives a first feature output from the first teacher block, the first student branch comprising a first student branch block corresponding to the second teacher block and a second student branch block corresponding to the third teacher block;

training the teacher model based on outputs of the teacher model and a first output of the first student branch by inputting images of a design pattern or a physical pattern of an integrated circuit as training data;

training a student model comprising a plurality of student blocks based on the trained teacher model by inputting images of the design pattern or the physical pattern of the integrated circuit as training data, the plurality of student blocks comprising a first student block corresponding to the first teacher block, a second student block corresponding to the second teacher block and a third student block corresponding to the third teacher block; and modeling a semiconductor process based on the trained student model, wherein the first student branch is generated separately from the plurality of student blocks of the student model, and wherein the first student branch has a structure that replicates the student model by configuring the first student branch block to have a same number of layers, a same number of parameters, a same size of feature, and a same bitwidth as the first student block and configuring the second student branch block to have a same number of layer, a same number of parameters, a same size of feature, and a same bitwidth as the third student block, wherein the first student branch comprises a first artificial neural network, wherein the student model comprises a second artificial neural network, wherein each of the plurality of student blocks of the student model has a lower complexity than a corresponding teacher block, among the plurality of teacher blocks in the teacher model or requires fewer resources than the corresponding teacher block in the teacher model, wherein the first student branch comprises a transformation layer configured to transform the first feature output from the first teacher block into a first student branch feature having a format processible by the first student block, and wherein the first output of the first student branch is a result that is partially processed by each of the teacher model and the student model represented by the first student branch.

6. The computer-implemented method of claim 5, wherein a number of student blocks included in the first student branch is same as a number of teacher blocks following the first teacher block among the plurality of teacher blocks, and wherein the plurality of teacher blocks is in a series.

7. The computer-implemented method of claim 6, wherein the second teacher block follows the first teacher block among the plurality of teacher blocks.

8. The computer-implemented method of claim 5, further comprising:

generating a second student branch, which receives a second feature output from the second teacher block among the plurality of teacher blocks, wherein the training of the teacher model is based on one or more outputs of the teacher model, the first output of the first student branch, and a second output of the second student branch, and wherein the second student branch corresponds to at least one second student block among the plurality of student blocks.

9. The computer-implemented method of claim 8, wherein a number of blocks included in the second student branch is different from a number of blocks included in the first student branch.

10. The computer-implemented method of claim 5, wherein the training of the teacher model comprises calculating a first loss function based on a difference between one or more outputs of the teacher model and label data.

11. The computer-implemented method of claim 5, wherein the training of the teacher model comprises calculating a second loss function based on a difference between one or more outputs of the teacher model and the first output of the first student branch.

12. The computer-implemented method of claim 5, wherein the training of the teacher model comprises calculating a third loss function based on a difference between the first output of the first student branch and label data.

13. A non-transitory computer-readable storage medium comprising instructions executable by at least one processor, wherein the instructions cause the at least one processor to perform operations of model training comprising:

dividing a teacher model into a plurality of teacher blocks each comprising a plurality of layers, the plurality of teacher blocks comprising a first teacher block, a second teacher block and a third teacher block;

generating a first student branch, which receives a first feature output from the first teacher block, the first student branch comprising a first student branch block corresponding to the second teacher block and a second student branch block corresponding to the third teacher block;

training the teacher model based on outputs of the teacher model and a first output of the first student branch by inputting images of a design pattern or a physical pattern of an integrated circuit as training data; and training a student model comprising a plurality of student blocks based on the trained teacher model by inputting images of the design pattern or the physical pattern of the integrated circuit as training data, the plurality of student blocks comprising a first student block corresponding to the first teacher block, a second student block corresponding to the second teacher block and a third student block corresponding to the third teacher block; and modeling a semiconductor process based on the trained student model, wherein the first student branch is generated separately from the plurality of student blocks of the student model, and wherein the first student branch has a structure that replicates the student model by configuring the first student branch block to have a same number of layers, a same number of parameters, a same size of feature, and a same bitwidth as the first student block and configuring the second student branch block to have a same number of layer, a same number of parameters, a same size of feature, and a same bitwidth as the third student block, wherein the first student branch comprises a first artificial neural network, wherein the student model comprises a second artificial neural network, wherein each of the plurality of student blocks of the student model has a lower complexity than a corresponding teacher block, among the plurality of teacher blocks in the teacher model or requires fewer resources than the corresponding teacher block in the teacher model, wherein the first student branch comprises a transformation layer configured to transform the first feature output from the first teacher block into a first student branch feature having a format processible by the first student block, and wherein the first output of the first student branch is a result that is partially processed by each of the teacher model and the student model represented by the first student branch.

14. The non-transitory computer-readable storage medium of claim 13, wherein a number of student blocks included in the first student branch is same as a number of teacher blocks following the first teacher block among the plurality of teacher blocks, and wherein the plurality of teacher blocks is in a series.

15. The non-transitory computer-readable storage medium of claim 14, wherein the second teacher block follows the first teacher block among the plurality of teacher blocks.

16. The non-transitory computer-readable storage medium of claim 13, wherein the operations of training the teacher model and the student model further comprise:

generating a second student branch, which receives a second feature output from the second teacher block among the plurality of teacher blocks, wherein the training of the teacher model is based on one or more outputs of the teacher model, the first output of the first student branch, and a second output of the second student branch, and wherein the second student branch corresponds to at least one second student block among the plurality of student blocks.

* * * * *